United States Patent [19]

Shamoon

[11] 4,041,964
[45] Aug. 16, 1977

[54] KITCHEN CUTTINGBOARD

[76] Inventor: Ellis Shamoon, 3618 Gillespie, Suite 109, Dallas, Tex. 75219

[21] Appl. No.: 697,833

[22] Filed: June 21, 1976

[51] Int. Cl.² ............................................. B08B 3/02
[52] U.S. Cl. ................................. 134/115 R; 134/198; 134/201; 4/187 R; 108/26; 269/302.1; 312/140.4; 312/228
[58] Field of Search ........... 134/84, 92, 115 R, 115 G, 134/183, 198, 201; 269/302.1; 108/25, 26; 211/126; 4/187 R, 190; 312/140.1, 140.4, 228, 229

[56] References Cited

U.S. PATENT DOCUMENTS

| 511,048 | 12/1893 | Groves | 312/228 |
| 1,346,470 | 7/1920 | Schroeder | 134/84 UX |
| 1,628,746 | 5/1927 | Russel | 134/92 |
| 2,579,393 | 12/1951 | Modrey | 134/115 R X |
| 2,667,392 | 1/1954 | Sexton | 108/26 |
| 2,929,075 | 3/1960 | Hyde | 4/187 R |

FOREIGN PATENT DOCUMENTS

| 2,260,259 | 8/1975 | France | 269/302.1 |
| 207,353 | 11/1923 | United Kingdom | 108/25 |

Primary Examiner—Robert L. Bleutge
Attorney, Agent, or Firm—Crisman & Moore

[57] ABSTRACT

A cuttingboard for kitchens and the like is provided wherein a generally planar cutting surface is adapted for positioning directly over a sink basin. A flange depends from the front side of the cuttingboard for abutting engagement with the counter top of a conventional kitchen sink area for purposes of stability. An aperture is provided adjacent the aft side of the planar portion and in a position to underlie a conventional faucet of a kitchen sink when the cuttingboard is appropriately positioned. A wire basket is similarly provided for secured positioning in the aperture while depending into the sink for holding foods therein. In this manner, the foods being prepared may be stored, washed and/or strained with maximum efficiency and minimal inconvenience.

10 Claims, 2 Drawing Figures

KITCHEN CUTTINGBOARD

BACKGROUND OF THE INVENTION

The invention relates to kitchen cuttingboards, and, more particularly, to a lightweight stabilizable cuttingboard adapted for the simultaneous preparation and washing or vegetables positioned thereon.

It is generally the practice in the kitchens of restaurants and homes to cut and wash vegetables in preparation for cooking and serving them. Usually a separate cuttingboard is utilized in the vicinity of a sink for preparation of the vegetables and other foodstuffs. The conventional cuttingboard is made of material which can withstand the cutting action of knives and the like and is generally large and heavy enough to accommodate food storage and to remain stationary during cutting pressure and motions. Large cuttingboards, while more efficient in use, are generally bulkier and more inconvenient to handle and wash than smaller and lighter weight cuttingboards. However, smaller, lighter weight cuttingboards generally have a tendency to move under heavy cutting action and therefore require stabilizing. With either type of board, it is generally necessary to move the board to the sink for washing the cut vegetables and/or the board itself. When washing cut vegetables, it is often expedient to utilize a wire mesh strainer or the like. In such instances it is necessary to transfer the vegetables to the strainer and to then discard the unwanted trimmed porirtions, either in a trash receptacle or a sink disposal unit.

It would be an advantage therefore to overcome certain of the problems and inconveniences of prior art apparatus by providing an improved kitchen cuttingboard which can be used directly over a kitchen sink, is lightweight and, yet, is easily and effectively stabilized during use. The cuttingboard of the present invention is especially adapted for use directly over a sink and for accommodating the simultaneous washing and discarding of portions of vegetables and the like prepared thereon. In this manner, the operation of cutting, storing, washing and discarding foodstuffs is facilitated directly in the area in which each of the above functions is most expeditiously effected and in the most sanitary configuration.

SUMMARY OF THE INVENTION

The invention relates to apparatus for use in kitchens in the preparation of foods, which apparatus includes a cuttingboard structure adapted for secured positioning over a kitchen sink and/or kitchen countertop area. In particular, the cuttingboard is adapted for positioning beneath the arcuate path of rotation of a sink faucet. The cuttingboard includes a planar cutting surface adapted for generally horizontal positioning over a sink basin and having an aperture formed therein for open-ended communication with the basin therebelow. A frontal flange is provided in depending relationship to the cutting surface and generally perpendicular thereto. The flange is adapted for abutting engagement against the kitchen sink countertop area for stabilization. A removable basket is also provided in the aperture in the cuttingboard for positioning beneath the sink faucet and for receiving cut foods therein which need washing and/or straining.

In another aspect, the invention includes a cuttingboard formed of plastic, polyethelene, polypropelene or wood which is adapted for secured positioning over a kitchen sink area. The cuttingboard is adapted to be secured by the pressure of a person leaning against a frontal flange formed thereacross. A wire mesh basket is adapted for secured positioning in an aperture formed in a rear quadrant of the generally rectangular cutting surface. The basket may be used to hold prepared foods and/or for the washing thereof. The basket is provided with upstanding handles of a contoured configuration which serve as means for securing the basket in the aperture and facilitating its ready removal. Once removed the basket leaves an open orifice in the cutting surface through which food trimmings can be deposited into the sink and/or disposal unit therebelow.

BRIEF DESCRIPTION OF THE DRAWINGS

For a more complete understanding of the present invention and for further objects and advantages thereof, reference may now be had to the following description taken in conjunction with the accompanying drawings, in which.

DETAILED DESCRIPTION

Figure 1:
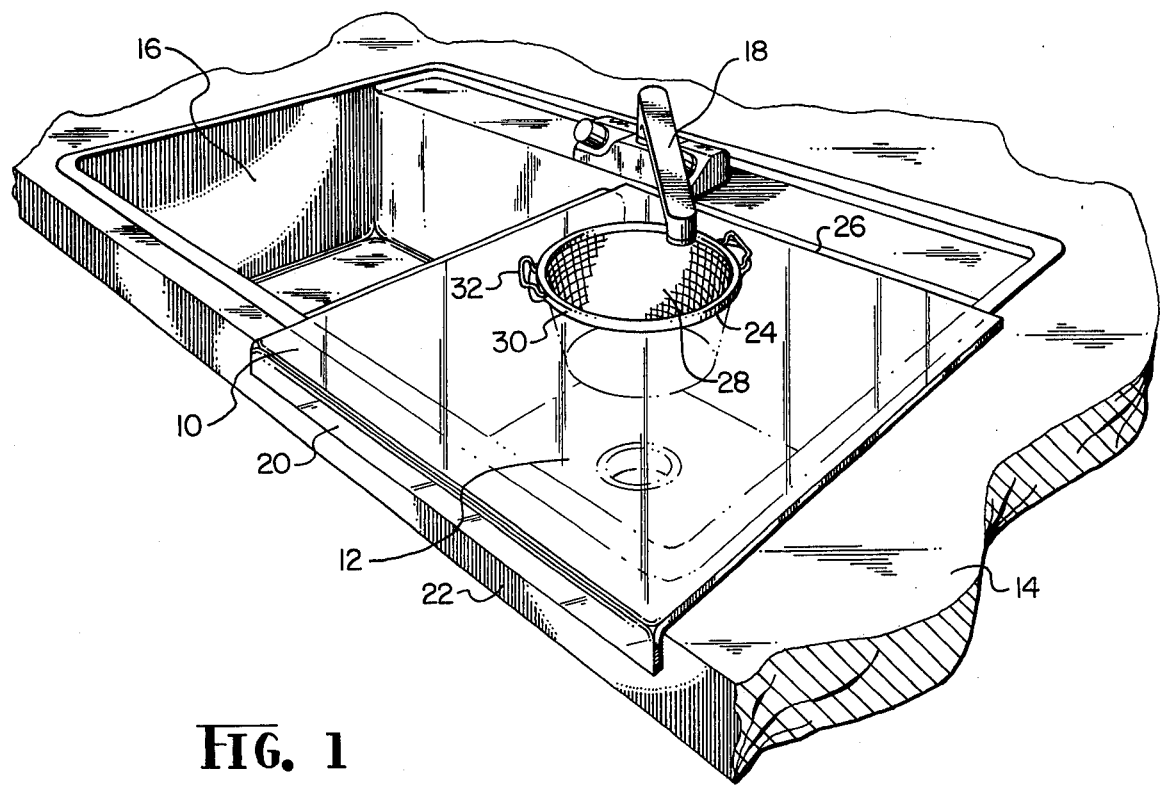
FIG. 1 is a perspective view of one embodiment of a kitchen cuttingboard constructed in accordance with the principles of the present invention and positioned over a sink basin shown in phantom for purposes of illustration.

Referring first to FIG. 1, there is shown a perspective view of one embodiment of a kitchen cuttingboard 10 constructed in accordance with the principles of the present invention and adapted for the preparation of vegetables and other foodstuffs directly over a multifunctional area such as a kitchen sink basin. The cuttingboard 10 herein described includes a generally planar cutting surface 12 adapted for lying upon a kitchen counter 14 and/or across a kitchen sink basin 16 beneath a sink faucet 18. The cutting surface 12 is positioned and stabilized through a frontal edge or flange 20 which depends generally perpendicular therefrom. The flange 20 is adapted for abutting a face 22 of the counter 14 and for being held thereagainst by the weight of a person utilizing the cuttingboard 10 for food preparation.

The cuttingboard 10 is specifically adapted for positioning over the sink basin 16 and immediately beneath the arcuate rotational path of the sink faucet 18. A generally circular aperture 24, having appropriate mounting indentures as shown, is therein provided near the rear edge 26 of the cutting surface 12 and is centered for positioning directly under the faucet 18. A basket 28, preferably of wire mesh or the like, is similarly provided for secured positioning within the open orifice of aperture 24 for holding trimmed and sliced foodstuffs therein. Basket 28 is constructed for mating engagement in the aperture 24 to thereindepend in open-ended communication with the sink basin 16 therebeneath, and with the top rim 30 of the basket flush or beneath the top plane of the cutting surface 12. In this manner, vegetables and other foodstuffs may be chopped, sliced, trimmed and/or similarly prepared upon the cutting surface 12 and simply scraped or pushed into the basket 28 for washing or storage without striking the basket with the knife. Since the aperture 24 may be positioned beneath the faucet 18, the step of washing the aforesaid vegetables or other foodstuffs is readily facilitated.

Figure 2:
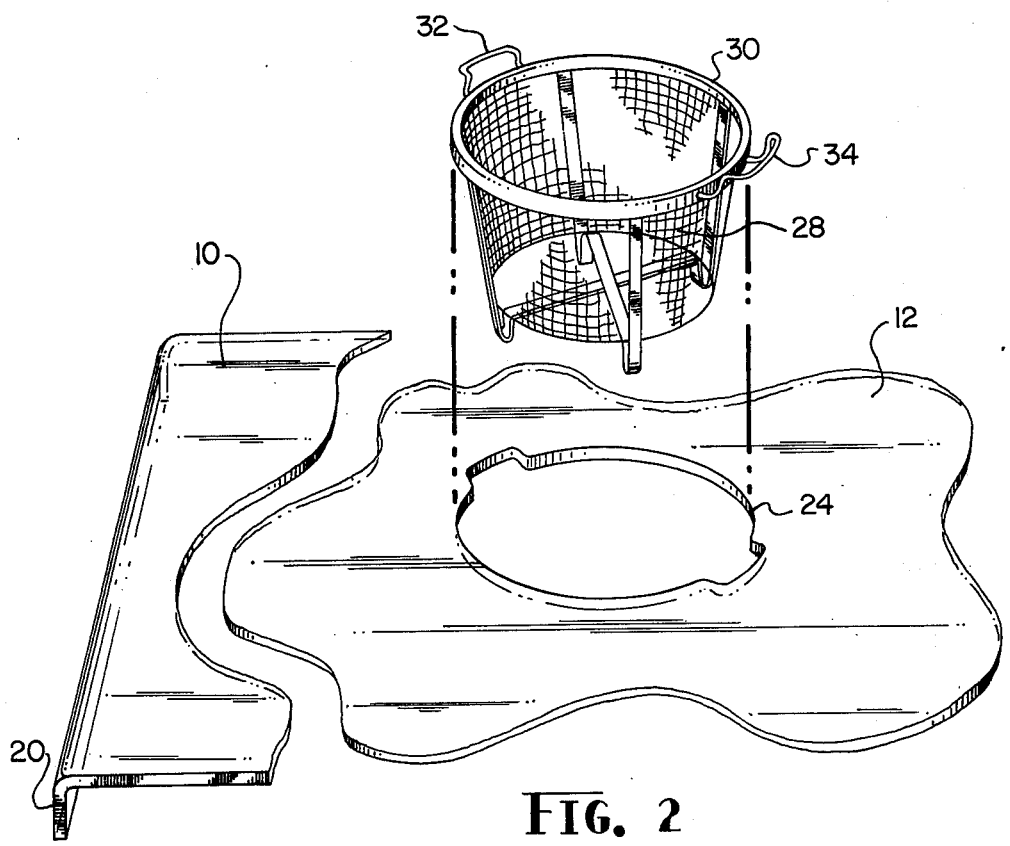
FIG. 2 is a perspective view of the kitchen cuttingboard of FIG. 1 with the wire basket removed for purposes of illustration.

Referring now to FIG. 2, it may be seen that the cuttingboard 10 may be constructed of lightweight material such as plastic. Clear "Acrylic" of thickness on the order of ⅛ inch has been found to be satisfactory for the fabrication of such apparatus. Such material can be cut, shaped and bored for particular applications, alternate configurations and/or constructional embodiment. For example, a frontal flange 20 may be seen in the present illustration to comprise an integrally formed, depending section of cutting surface 12. This construction and embodiment provides a structurally effective and aesthetically pleasing appearance for the cuttingboard 10. Similarly, the use of clear plastic, rather than conventional cutting material such as non-transparent wood, permits observation through the cuttingboard 10 into the sink basin 16. In the particular embodiment illustrated herein, this transparency feature may be very advantageous in that decorations may be affixed to the underneath side of the cutting surface 12 for aesthetic purposes. Also, when the faucet 18 is turned on, in order to wash the vegetables in the basket 28, it may be advantageous to observe the sink basin 16 therebeneath and the water level therein.

As shown in FIG. 2, the basket 28 may be removed from the aperture 24. The basket 28 is thus constructed in suitable lightweight durable material such as conventional wire mesh or the like, and in a configuration for direct application in holding cut vegetables and foodstuffs during washing. The basket 28 is preferably of a hemispherical construction and is provided with a suitably rigid rim 30. A pair of handles 32 are preferably provided on the rim 30 for the handling and securement of the basket 28. Each handle 32 may be seen to include a contoured upper arm 34. The contoured arm 34 permits the basket 28 to be secured within the aperture 24 with the rim 30 flush beneath the cutting surface 12. The arm 34 therein extends outwardly from the rim 30 and rests on the cutting surface 12 adjacent the aperture 24 when the basket 28 is inserted therein providing secured engagement therewith.

In operation the cuttingboard 10 provides numerous functional advantages over prior art structures. For example, the basket 28 may be removed for efficient storage. The cuttingboard 10 may also be handled easily because of its lightweight construction. During food preparation, the lightweight aspect of the material is offset by the capacity to stabilize the cutting surface 12 by leaning against the frontal flange 20 and the counter face 22 therebeneath. In this manner, normal cutting pressure upon the cutting surface 12 will not cause the cuttingboard 10 to shift, as is the case with more conventional boards. It should be apparent also that utilization of the cuttingboard 10 specifically over a kitchen sink 16 provides enumerable advantages. Water from the faucet 18 is immediately accessible. Trimmed portions of foodstuffs may be shoved directly into the sink 16 and/or a disposal unit (not shown) for discarding. And, as said above, prepared foods can be immediately stored and/or washed in the basket 18 while the cuttingboard 10 is still being used.

It is believed that the operation and construction of the above-described invention will be apparent from the foregoing description. While the kitchen cuttingboard and the constructional embodiments shown and described have been characterized as being preferred, it will be obvious that various changes and modifications may be made without departing from the spirit and scope of the invention as defined in the following claims.

What is claimed is:

1. A cuttingboard for use in kitchens in the preparation of foods, which cuttingboard is adapted for secured positioning by a person over a kitchen sink and countertop area beneath the arcuate path of rotation of a sink faucet, said cuttingboard comprising:
    a planar cutting surface adapted for generally horizontal positioning over a kitchen sink and having an aperture formed therein for open-ended communication with the sink area therebelow;
    a frontal flange depending from the front edge of said cutting surface and generally perpendicular thereto for abutting engagement against the kitchen sink countertop area with a person leaning thereagainst for stabilized positioning thereon;
    said cutting surface and frontal flange being adapted for positioning over the sink with said aperture disposed immediately under a portion of the arcuate path of rotation of the sink faucet; and
    a removable basket adapted for secured positioning in said aperture and beneath the sink faucet for holding foods prepared on said cutting surface for the washing thereof.

2. A cuttingboard as set forth in claim 1 wherein said cutting surface is comprised of a generally rectangular configuration with said aperture formed in a rear quadrant thereof.

3. A cuttingboard as set forth in claim 1 wherein said frontal flange is comprised of a generally rectangular configuration having a smooth outer surface adapted for receiving the pressure of a person leaning thereagainst for the stabilized securement thereof.

4. A cuttingboard as set forth in claim 1 wherein said cutting surface and said frontal flange are comprised of generally clear plastic material which permits a person to view the sink and countertop area therethrough.

5. A cuttingboard as set forth in claim 1 wherein said aperture in said cutting surface is a generally circular orifice adapted for receiving water therethrough from a sink faucet thereabove.

6. A cuttingboard as set forth in claim 1 wherein said basket is a wire mesh receptacle of a generally hemispherical configuration and includes an upstanding handle adapted for engaging a portion of the cutting surface adjacent said aperture for the secured positioning therein in generally flush relationship to the top plane of said cutting surface.

7. A cuttingboard as set forth in Claim 6 wherein said basket includes a pair of upstanding handles positioned on opposite sides of said basket for engaging a portion of the cutting surface adjacent said aperture for the secured positioning therein.

8. A cutting board as set forth in claim 7 wherein said handles are formed in a contoured configuration for extending outwardly of the aperture and resting on the cutting surface therearound and securing said basket therein.

9. A cutting board as set forth in claim 1 wherein said cutting surface and said frontal flange of said cuttingboard are integrally formed one to the other.

10. A cuttingboard as set forth in claim 1 wherein:
    said frontal flange is comprised of a generally rectangular configuration of material having a smooth outer surface adapted for receiving the pressure of a person leaning thereagainst for the stabilized securement thereof;

said cutting surface is comprised of material having a generally rectangular configuration with said aperture formed in a rear quadrant thereof;
said aperture in said cutting surface is comprised of a generally circular orifice adapted for receiving water therethrough from the sink faucet thereabove; and
said basket in said aperture is a removable mesh receptacle of a generally hemispherical configuration which includes a pair of upstanding handles formed in a contoured configuration for resting upon the cutting surface adjacent said aperture for securing said basket therein.

* * * * *